(12) United States Patent
Miller

(10) Patent No.: US 11,112,862 B2
(45) Date of Patent: Sep. 7, 2021

(54) VIEWING SYSTEM WITH INTERPUPILLARY DISTANCE COMPENSATION BASED ON HEAD MOTION

(71) Applicant: Magic Leap, Inc., Plantation, FL (US)

(72) Inventor: Samuel A. Miller, Hollywood, FL (US)

(73) Assignee: Magic Leap, Inc., Plantation, FL (US)

( * ) Notice: Subject to any disclaimer, the term of this patent is extended or adjusted under 35 U.S.C. 154(b) by 8 days.

(21) Appl. No.: 16/530,776

(22) Filed: Aug. 2, 2019

(65) Prior Publication Data

US 2020/0042081 A1 Feb. 6, 2020

Related U.S. Application Data

(60) Provisional application No. 62/714,056, filed on Aug. 2, 2018.

(51) Int. Cl.
G06F 3/01 (2006.01)
G06T 7/70 (2017.01)
G02B 27/01 (2006.01)

(52) U.S. Cl.
CPC .......... *G06F 3/012* (2013.01); *G02B 27/0172* (2013.01); *G02B 27/0179* (2013.01); *G06F 3/013* (2013.01); *G06T 7/70* (2017.01); *G02B 2027/0138* (2013.01); *G02B 2027/0178* (2013.01); *G02B 2027/0181* (2013.01); *G02B 2027/0187* (2013.01); *G06T 2207/30201* (2013.01)

(58) Field of Classification Search
CPC ....................................................... G02B 7/12
See application file for complete search history.

(56) References Cited

U.S. PATENT DOCUMENTS

| | | |
|---|---|---|
| 4,344,092 A | 8/1982 | Miller |
| 4,652,930 A | 3/1987 | Crawford |
| 4,810,080 A | 3/1989 | Grendol et al. |
| 4,997,268 A | 3/1991 | Dauvergne |
| 5,007,727 A | 4/1991 | Kahaney et al. |
| 5,074,295 A | 12/1991 | Willis |
| 5,240,220 A | 8/1993 | Elberbaum |
| 5,410,763 A | 5/1995 | Bolle |
| 5,455,625 A | 10/1995 | Englander |
| 5,495,286 A | 2/1996 | Adair |

(Continued)

FOREIGN PATENT DOCUMENTS

| | | |
|---|---|---|
| EP | 0535402 A1 | 4/1993 |
| EP | 1215522 A2 | 6/2002 |

(Continued)

OTHER PUBLICATIONS

Invitation to Pay Additional Fees dated Oct. 17, 2019, International PCT Patent Application No. PCT/US19/44953, (2 pages).

(Continued)

*Primary Examiner* — Ryan McCulley
(74) *Attorney, Agent, or Firm* — Stephen M. DeKlerk

(57) ABSTRACT

The invention provides a viewing system including an augmented reality system that generates a visual presentation to a user based at least in part on an IPD of the user, and an IPD compensator that adjusts the visual presentation based on an IPD compensation factor.

17 Claims, 11 Drawing Sheets

(56) References Cited

U.S. PATENT DOCUMENTS

| | | | |
|---|---|---|---|
| 5,497,463 A | 3/1996 | Stein et al. |
| 5,682,255 A | 10/1997 | Friesem et al. |
| 5,854,872 A | 12/1998 | Tai |
| 5,864,365 A | 1/1999 | Sramek et al. |
| 6,012,811 A | 1/2000 | Chao et al. |
| 6,016,160 A | 1/2000 | Coombs et al. |
| 6,076,927 A | 6/2000 | Owens |
| 6,117,923 A | 9/2000 | Amagai et al. |
| 6,124,977 A | 9/2000 | Takahashi |
| 6,191,809 B1 | 2/2001 | Hori et al. |
| 6,375,369 B1 | 4/2002 | Schneider et al. |
| 6,541,736 B1 | 4/2003 | Huang et al. |
| 6,757,068 B2 | 6/2004 | Foxlin |
| 7,431,453 B2 | 10/2008 | Hogan |
| 7,573,640 B2 | 8/2009 | Nivon et al. |
| 7,724,980 B1 | 5/2010 | Shenzhi |
| 7,751,662 B2 | 7/2010 | Kleemann |
| 7,758,185 B2 | 7/2010 | Lewis |
| 8,246,408 B2 | 8/2012 | Elliot |
| 8,353,594 B2 | 1/2013 | Lewis |
| 8,508,676 B2 | 8/2013 | Silverstein et al. |
| 8,619,365 B2 | 12/2013 | Harris et al. |
| 8,696,113 B2 | 4/2014 | Lewis |
| 8,733,927 B1 | 5/2014 | Lewis |
| 8,759,929 B2 | 6/2014 | Shiozawa et al. |
| 8,847,988 B2 | 9/2014 | Geisner et al. |
| 9,010,929 B2 | 4/2015 | Lewis |
| 9,095,437 B2 | 8/2015 | Boyden et al. |
| 9,239,473 B2 | 1/2016 | Lewis |
| 9,244,293 B2 | 1/2016 | Lewis |
| 9,581,820 B2 | 2/2017 | Robbins |
| 9,658,473 B2 | 5/2017 | Lewis |
| 9,671,566 B2 | 6/2017 | Abovitz et al. |
| 9,671,615 B1 | 6/2017 | Vallius et al. |
| 9,874,664 B2 | 1/2018 | Stevens et al. |
| 9,955,862 B2 | 5/2018 | Freeman et al. |
| 10,018,844 B2 | 7/2018 | Levola et al. |
| 10,151,937 B2 | 12/2018 | Lewis |
| 10,185,147 B2 | 1/2019 | Lewis |
| 10,218,679 B1 | 2/2019 | Jawahar |
| 10,551,879 B1 | 2/2020 | Richards et al. |
| 2001/0010598 A1 | 8/2001 | Aritake et al. |
| 2002/0063913 A1 | 5/2002 | Nakamura et al. |
| 2002/0071050 A1 | 6/2002 | Homberg |
| 2002/0122648 A1 | 9/2002 | Mule' et al. |
| 2002/0140848 A1 | 10/2002 | Cooper et al. |
| 2003/0048456 A1 | 3/2003 | Hill |
| 2003/0067685 A1 | 4/2003 | Niv |
| 2003/0077458 A1 | 4/2003 | Korenaga et al. |
| 2003/0219992 A1 | 11/2003 | Schaper |
| 2004/0001533 A1 | 1/2004 | Tran et al. |
| 2004/0021600 A1 | 2/2004 | Wittenberg |
| 2004/0042377 A1 | 3/2004 | Nikoloai et al. |
| 2004/0174496 A1* | 9/2004 | Ji .................... G06F 3/013 351/209 |
| 2004/0186902 A1 | 9/2004 | Stewart |
| 2004/0240072 A1 | 12/2004 | Schindler et al. |
| 2004/0246391 A1 | 12/2004 | Travis |
| 2005/0001977 A1 | 1/2005 | Zelman |
| 2005/0157159 A1 | 7/2005 | Komiya et al. |
| 2005/0273792 A1 | 12/2005 | Inohara et al. |
| 2006/0013435 A1 | 1/2006 | Rhoads |
| 2006/0015821 A1 | 1/2006 | Jacques Parker et al. |
| 2006/0038880 A1 | 2/2006 | Starkweather et al. |
| 2006/0050224 A1 | 3/2006 | Smith |
| 2006/0126181 A1 | 6/2006 | Levola |
| 2006/0132914 A1 | 6/2006 | Weiss et al. |
| 2006/0221448 A1 | 10/2006 | Nivon et al. |
| 2006/0228073 A1 | 10/2006 | Mukawa et al. |
| 2006/0250322 A1* | 11/2006 | Hall ................ G02B 27/0172 345/8 |
| 2006/0268220 A1 | 11/2006 | Hogan |
| 2007/0058248 A1 | 3/2007 | Nguyen et al. |
| 2007/0159673 A1 | 7/2007 | Freeman et al. |
| 2007/0188837 A1 | 8/2007 | Shimizu et al. |
| 2007/0204672 A1 | 9/2007 | Huang et al. |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0043334 A1 | 2/2008 | Itzkovitch et al. |
| 2008/0063802 A1 | 3/2008 | Maula et al. |
| 2008/0068557 A1 | 3/2008 | Menduni et al. |
| 2008/0146942 A1 | 6/2008 | Dala-Krishna |
| 2008/0205838 A1 | 8/2008 | Crippa et al. |
| 2008/0316768 A1 | 12/2008 | Travis |
| 2009/0153797 A1 | 6/2009 | Allon et al. |
| 2009/0224416 A1 | 9/2009 | Laakkonen et al. |
| 2009/0245730 A1 | 10/2009 | Kleemann |
| 2009/0310633 A1 | 12/2009 | Ikegami |
| 2010/0056274 A1 | 3/2010 | Uusitalo et al. |
| 2010/0063854 A1 | 3/2010 | Purvis et al. |
| 2010/0079841 A1 | 4/2010 | Levola |
| 2010/0232016 A1 | 9/2010 | Landa et al. |
| 2010/0244168 A1 | 9/2010 | Shiozawa et al. |
| 2010/0296163 A1 | 11/2010 | Sarikko |
| 2011/0050655 A1 | 3/2011 | Mukawa |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0050535 A1 | 3/2012 | Densham et al. |
| 2012/0113235 A1* | 5/2012 | Shintani ............ H04N 13/398 348/51 |
| 2012/0154557 A1 | 6/2012 | Perez et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0307075 A1 | 12/2012 | Margalitq |
| 2012/0314959 A1 | 12/2012 | White et al. |
| 2012/0326948 A1 | 12/2012 | Crocco et al. |
| 2013/0050833 A1 | 2/2013 | Lewis et al. |
| 2013/0077170 A1 | 3/2013 | Ukuda |
| 2013/0094148 A1 | 4/2013 | Sloane |
| 2013/0169923 A1 | 7/2013 | Schnoll et al. |
| 2013/0336138 A1 | 12/2013 | Venkatraman et al. |
| 2014/0016821 A1 | 1/2014 | Arth et al. |
| 2014/0022819 A1 | 1/2014 | Oh et al. |
| 2014/0119598 A1 | 5/2014 | Ramachandran et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0267419 A1 | 9/2014 | Ballard et al. |
| 2014/0274391 A1 | 9/2014 | Stafford |
| 2015/0005785 A1 | 1/2015 | Olson |
| 2015/0009099 A1 | 1/2015 | Queen |
| 2015/0123966 A1 | 5/2015 | Newman |
| 2015/0130790 A1 | 5/2015 | Vasquez, II et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0205126 A1 | 7/2015 | Schowengerdt |
| 2015/0235431 A1 | 8/2015 | Schowengerdt |
| 2015/0253651 A1* | 9/2015 | Russell ............ G03B 17/561 224/181 |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0338915 A1 | 11/2015 | Publicover et al. |
| 2015/0355481 A1 | 12/2015 | Hilkes et al. |
| 2016/0027215 A1 | 1/2016 | Burns et al. |
| 2016/0077338 A1 | 3/2016 | Robbins et al. |
| 2016/0085300 A1 | 3/2016 | Robbins et al. |
| 2016/0093099 A1 | 3/2016 | Bridges |
| 2016/0123745 A1 | 5/2016 | Cotier et al. |
| 2016/0155273 A1 | 6/2016 | Lyren et al. |
| 2016/0180596 A1 | 6/2016 | Gonzalez del Rosario |
| 2016/0202496 A1 | 7/2016 | Billetz et al. |
| 2016/0217624 A1 | 7/2016 | Finn et al. |
| 2016/0266412 A1 | 9/2016 | Yoshida |

(56) References Cited

U.S. PATENT DOCUMENTS

| | | | |
|---|---|---|---|
| 2016/0321551 A1 | 11/2016 | Priness et al. |
| 2016/0327798 A1 | 11/2016 | Xiao et al. |
| 2016/0357255 A1 | 12/2016 | Lindh et al. |
| 2016/0370510 A1 | 12/2016 | Thomas |
| 2017/0038607 A1 | 2/2017 | Camara |
| 2017/0061696 A1 | 3/2017 | Li et al. |
| 2017/0100664 A1 | 4/2017 | Osterhout et al. |
| 2017/0115487 A1 | 4/2017 | Travis |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0192239 A1 | 7/2017 | Nakamura et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0232345 A1 | 8/2017 | Rofougaran et al. |
| 2017/0235126 A1 | 8/2017 | DiDomenico |
| 2017/0235142 A1 | 8/2017 | Wall et al. |
| 2017/0235147 A1 | 8/2017 | Kamakura |
| 2017/0281054 A1 | 10/2017 | Stever et al. |
| 2017/0293141 A1 | 10/2017 | Schowengerdt et al. |
| 2017/0312032 A1 | 11/2017 | Amanatullah et al. |
| 2017/0329137 A1 | 11/2017 | Tervo |
| 2017/0332098 A1 | 11/2017 | Rusanovskyy et al. |
| 2017/0357332 A1 | 12/2017 | Balan et al. |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0088185 A1 | 3/2018 | Woods et al. |
| 2018/0102981 A1 | 4/2018 | Kurtzman et al. |
| 2018/0136466 A1 | 5/2018 | Ko |
| 2018/0190017 A1 | 7/2018 | Mendez et al. |
| 2018/0250589 A1 | 9/2018 | Cossairt et al. |
| 2019/0005069 A1 | 1/2019 | Filgueiras de Arajuo et al. |
| 2019/0011691 A1 | 1/2019 | Peyman |
| 2019/0056591 A1 | 2/2019 | Tervo et al. |
| 2019/0101758 A1* | 4/2019 | Zhu ........................ G06T 3/00 |
| 2019/0172216 A1 | 6/2019 | Ninan et al. |
| 2019/0243123 A1 | 8/2019 | Bohn |
| 2019/0347853 A1 | 11/2019 | Chen et al. |
| 2021/0033871 A1 | 2/2021 | Jacoby et al. |

FOREIGN PATENT DOCUMENTS

| | | |
|---|---|---|
| EP | 1938141 A1 | 7/2008 |
| EP | 1943556 A2 | 7/2008 |
| EP | 3236211 A1 | 10/2017 |
| EP | 2723240 B1 | 8/2018 |
| JP | 2003-029198 A | 1/2003 |
| JP | 2007-012530 A | 1/2007 |
| JP | 2009-244869 A | 10/2009 |
| JP | 2012-015774 A | 1/2012 |
| JP | 6232763 B2 | 11/2017 |
| WO | 2002/071315 A2 | 9/2002 |
| WO | 2006132614 A1 | 12/2006 |
| WO | 2007/085682 A1 | 8/2007 |
| WO | 2007/102144 A1 | 9/2007 |
| WO | 2008148927 A1 | 12/2008 |
| WO | 2009/101238 A1 | 8/2009 |
| WO | 2013/049012 A1 | 4/2013 |
| WO | 2016/054092 A1 | 4/2016 |
| WO | 2017004695 A1 | 1/2017 |
| WO | 2018/044537 A1 | 3/2018 |
| WO | 2018087408 A1 | 5/2018 |
| WO | 2018166921 A1 | 9/2018 |
| WO | 2019148154 A1 | 8/2019 |
| WO | 2020010226 A1 | 1/2020 |

OTHER PUBLICATIONS

International Search Report and Written Opinion dated Dec. 23, 2019, International PCT Patent Application No. PCT/US19/44953, (11 pages).
Communication Pursuant to Article 94(3) EPC dated Sep. 4, 2019, European Patent Application No. 10793707.0, (4 pages).
Examination Report dated Jun. 19, 2020, European Patent Application No. 20154750.2, (10 pages).
Extended European Search Report dated May 20, 2020, European Patent Application No. 20154070.5, (7 pages).
Extended European Search Report dated Jun. 12, 2017, European Patent Application No. 16207441.3, (8 pages).
Final Office Action dated Aug. 10, 2020, U.S. Appl. No. 16/225,961, (13 pages).
Final Office Action dated Dec. 4, 2019, U.S. Appl. No. 15/564,517, (15 pages).
Final Office Action dated Feb. 19, 2020, U.S. Appl. No. 15/552,897, (17 pages).
International Search Report and Written Opinion dated Mar. 12, 2020, International PCT Patent Application No. PCT/US19/67919, (14 pages).
International Search Report and Written Opinion dated Aug. 15, 2019, International PCT Patent Application No. PCT/US19/33987, (20 pages).
International Search Report and Written Opinion dated Jun. 15, 2020, International PCT Patent Application No. PCT/US2020/017023, (13 pages).
International Search Report and Written Opinion dated Oct. 16, 2019, International PCT Patent Application No. PCT/US19/43097, (10 pages).
International Search Report and Written Opinion dated Oct. 16, 2019, International PCT Patent Application No. PCT/US19/36275, (10 pages).
International Search Report and Written Opinion dated Oct. 16, 2019, International PCT Patent Application No. PCT/US19/43099, (9 pages).
International Search Report and Written Opinion dated Jun. 17, 2016, International PCT Patent Application No. PCT/FI2016/050172, (9 pages).
International Search Report and Written Opinion dated Oct. 22, 2019, International PCT Patent Application No. PCT/US19/43751, (9 pages).
International Search Report and Written Opinion dated May 23, 2019, International PCT Patent Application No. PCT/US18/66514, (17 pages).
International Search Report and Written Opinion dated Sep. 26, 2019, International PCT Patent Application No. PCT/US19/40544, (12 pages).
International Search Report and Written Opinion dated Aug. 27, 2019, International PCT Application No. PCT/US2019/035245, (8 pages).
International Search Report and Written Opinion dated Dec. 27, 2019, International Application No. PCT/US19/47746, (16 pages).
International Search Report and Written Opinion dated Sep. 30, 2019, International Patent Application No. PCT/US19/40324, (7 pages).
International Search Report and Written Opinion dated Sep. 4, 2020, International Patent Application No. PCT/US20/31036, (13 pages).
International Search Report and Written Opinion dated Jun. 5, 2020, International Patent Application No. PCT/US20/19871, (9 pages).
International Search Report and Written Opinion dated Aug. 8, 2019, International PCT Patent Application No. PCT/US2019/034763, (8 pages).
International Search Report and Written Opinion dated Oct. 8, 2019, International PCT Patent Application No. PCT/US19/41151, (7 pages).
International Search Report and Written Opinion dated Jan. 9, 2020, International Application No. PCT/US19/55185, (10 pages).
International Search Report and Written Opinion dated Feb. 28, 2019, International Patent Application No. PCT/US18/64686, (8 pages).

(56) References Cited

OTHER PUBLICATIONS

International Search Report and Written Opinion dated Feb. 7, 2020, International PCT Patent Application No. PCT/US2019/061265, (11 pages).
International Search Report and Written Opinion dated Jun. 11, 2019, International PCT Application No. PCT/US19/22620, (7 pages).
Invitation to Pay Additional Fees dated Aug. 15, 2019, International PCT Patent Application No: PCT/US19/36275, (2 pages).
Invitation to Pay Additional Fees dated Sep. 24, 2020, International Patent Application No. PCT/US2020/043596, (3 pages).
Invitation to Pay Additional Fees dated Oct. 22, 2019, International PCT Patent Application No. PCT/US19/47746, (2 pages).
Invitation to Pay Additional Fees dated Apr. 3, 2020, International Patent Application No. PCT/US20/17023, (2 pages).
Non Final Office Action dated Aug. 21, 2019, U.S. Appl. No. 15/564,517, (14 pages).
Non Final Office Action dated Jul. 27, 2020, U.S. Appl. No. 16/435,933, (16 pages).
Non Final Office Action dated Jun. 17, 2020, U.S. Appl. No. 16/682,911, (22 pages).
Non Final Office Action dated Jun. 19, 2020, U.S. Appl. No. 16/225,961, (35 pages).
Non Final Office Action dated Nov. 19, 2019, U.S. Appl. No. 16/355,611, (31 pages).
Non Final Office Action dated Oct. 22, 2019, U.S. Appl. No. 15/859,277, (15 pages).
Non Final Office Action dated Sep. 1, 2020, U.S. Appl. No. 16/214,575, (40 pages).
Notice of Allowance dated Mar. 25, 2020, U.S. Appl. No. 15/564,517, (11 pages).
Notice of Allowance dated Oct. 5, 2020, U.S. Appl. No. 16/682,911, (27 pages).
Notice of Reason of Refusal dated Sep. 11, 2020 with English translation, Japanese Patent Application No. 2019-140435, (6 pages).
Summons to attend oral proceedings pursuant to Rule 115(1) EPC dated Jul. 15, 2019, European Patent Application No. 15162521.7, (7 pages).
Aarik, J. et al., "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document, (2 pages).
AZOM, , "Silica—Silicon Dioxide (SiO2)", AZO Materials; Publication [Online]. Dec. 13, 2001 [retrieved Feb. 19, 2020]. Retrieved from the Internet: <URL: https://www.azom.com/article.aspx?Article1D=1114>, (6 pages).
Goodfellow, , "Titanium Dioxide—Titania (TiO2)", Azo Materials; Publication [online]. Jan. 11, 2002 [retrieved Feb. 19, 2020]. Retrieved from the Internet: <URL: https://www.azom.com/article.aspx?Article1D=1179>, (9 pages).
Levola, T. , "Diffractive Optics for Virtual Reality Displays", Journal of the SID Eurodisplay 14/05, 2005, XP008093627, chapters 2-3, Figures 2 and 10, pp. 467-475.
Levola, Tapani , "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.
Memon, F. et al., "Synthesis, Characterization and Optical Constants of Silicon Oxycarbide", EPJ Web of Conferences; Publication [online]. Mar. 23, 2017 [retrieved Feb. 19, 2020).<URL: https://www.epj-conferences.org/articles/epjconf/pdf/2017/08/epjconf_nanop2017_00002. pdf>; DOI: 10.1051/epjconf/201713900002, (8 pages).
Spencer, T. et al., "Decomposition of poly(propylene carbonate) with UV sensitive iodonium 11 salts", Polymer Degradation and Stability; (online]. Dec. 24, 2010 (retrieved Feb. 19, 2020]., <URL: http:/fkohl.chbe.gatech.edu/sites/default/files/linked_files/publications/2011Decomposition%20of%20poly(propylene%20carbonate)%20with%20UV%20sensitive%20iodonium%20salts,pdf>; DOI: 10,1016/j.polymdegradstab.2010, 12.003, (17 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>, p. 238-246.
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
Azuma, Ronald T. , "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T. , "Predictive Tracking for Augmented Reality", Department of Computer Science, Chapel Hill NC; TR95-007, Feb. 1995, 262 pages.
Bimber, Oliver et al., "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Jacob, Robert J. , "Eye Tracking in Advanced Interface Design", Human-Computer Interaction Lab, Naval Research Laboratory, Washington, D.C., date unknown. 2003, pp. 1-50.
Tanriverdi, Vildan et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
European Search Report dated Oct. 15, 2020, European Patent Application No. 20180623.9, (10 pages).
Extended European Search Report dated Jan. 22, 2021, European Patent Application No. 18890390.0, (11 pages).
Extended European Search Report dated Nov. 3, 2020, European Patent Application No. 18885707.2, (7 pages).
Extended European Search Report dated Nov. 4, 2020, European Patent Application No. 20190980.1, (14 pages).
Final Office Action dated Nov. 24, 2020, U.S. Appl. No. 16/435,933, (44 pages).
International Search Report and Written Opinion dated Dec. 3, 2020, International Patent Application No. PCT/US20/43596, (25 pages).
Non Final Office Action dated Jan. 27, 2021, U.S. Appl. No. 16/225,961, (15 pages).
Phototourism Challenge, CVPR 2019 Image Matching Workshop. https://image matching-workshop. github.io., (16 pages).
Arandjelović, Relja et al., "Three things everyone should know to improve object retrieval", CVPR, 2012, (8 pages).
Battaglia, Peter W. et al., "Relational inductive biases, deep learning, and graph networks", arXiv:1806.01261, Oct. 17, 2018, pp. 1-40.
Berg, Alexander C et al., "Shape matching and object recognition using low distortion correspondences", In CVPR, 2005, (8 pages).
Bian, Jiawang et al., "GMS: Grid-based motion statistics for fast, ultra-robust feature correspondence.", In CVPR (Conference on Computer Vision and Pattern Recognition), 2017, (10 pages).
Brachmann, Eric et al., "Neural-Guided RANSAC: Learning Where to Sample Model Hypotheses", In ICCV (International Conference on Computer Vision ), arXiv:1905.04132v2 [cs.CV] Jul. 31, 2019, (17 pages).
Butail, et al., "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document, (8 pages).
Caetano, Tibério S et al., "Learning graph matching", IEEE TPAMI, 31(6):1048-1058, 2009.
Cech, Jan et al., "Efficient sequential correspondence selection by cosegmentation", IEEE TPAMI, 32(9):1568-1581, Sep. 2010.
Cuturi, Marco , "Sinkhorn distances: Lightspeed computation of optimal transport", NIPS, 2013, (9 pages).

(56) References Cited

OTHER PUBLICATIONS

Dai, Angela et al., "ScanNet: Richly-annotated 3d reconstructions of indoor scenes", In CVPR, arXiv:1702.04405v2 [cs.CV] Apr. 11, 2017, (22 pages).
Deng, Haowen et al., "PPFnet: Global context aware local features for robust 3d point matching", In CVPR, arXiv:1802.02669v2 [cs.CV] Mar. 1, 2018, (12 pages).
Detone, Daniel et al., "Deep image homography estimation", In RSS Work-shop: Limits and Potentials of Deep Learning in Robotics, arXiv:1606.03798v1 [cs.CV] Jun. 13, 2016, (6 pages).
Detone, Daniel et al., "Self-improving visual odometry", arXiv:1812.03245, Dec. 8, 2018, (9 pages).
Detone, Daniel et al., "SuperPoint: Self-supervised interest point detection and description", In CVPR Workshop on Deep Learning for Visual SLAM, arXiv:1712.07629v4 [cs.CV] Apr. 19, 2018, (13 pages).
Dusmanu, Mihai et al., "D2-net: A trainable CNN for joint detection and description of local features", CVPR, arXiv:1905.03561v1 [cs.CV] May 9, 2019, (16 pages).
Ebel, Patrick et al., "Beyond cartesian representations for local descriptors", ICCV, arXiv:1908.05547v1 [cs.CV] Aug. 15, 2019, (11 pages).
Fischler, Martin A et al., "Random sample consensus: a paradigm for model fitting with applications to image analysis and automated cartography", Communications of the ACM, 24(6): 1981, pp. 381-395.
Gilmer, Justin et al., "Neural message passing for quantum chemistry", In ICML, arXiv:1704.01212v2 [cs.LG] Jun. 12, 2017, (14 pages).
Hartley, Richard et al., "Multiple View Geometry in Computer Vision", Cambridge University Press, 2003, pp. 1-673.
Lee, Juho et al., "Set transformer: A frame-work for attention-based permutation-invariant neural networks", ICML, arXiv:1810.00825v3 [cs.LG] May 26, 2019, (17 pages).
Leordeanu, Marius et al., "A spectral technique for correspondence problems using pairwise constraints", Proceedings of (ICCV) International Conference on Computer Vision, vol. 2, pp. 1482-1489, Oct. 2005, (8 pages).
Li, Yujia et al., "Graph matching networks for learning the similarity of graph structured objects", ICML, arXiv:1904.12787v2 [cs.LG] May 12, 2019, (18 pages).
Li, Zhengqi et al., "Megadepth: Learning single-view depth prediction from internet photos", In CVPR, fromarXiv: 1804.00607v4 [cs.CV] Nov. 28, 2018, (10 pages).
Loiola, Eliane M. et al., "A survey for the quadratic assignment problem", European journal of operational research, 176(2): 2007, pp. 657-690.
Lowe, David G. , "Distinctive image features from scale-invariant keypoints", International Journal of Computer Vision, 60(2): 91-110, 2004, (28 pages).
Luo, Zixin et al., "ContextDesc: Local descriptor augmentation with cross-modality context", CVPR, arXiv:1904.04084v1 [cs.CV] Apr. 8, 2019, (14 pages).
Munkres, James , "Algorithms for the assignment and transportation problems", Journal of the Society for Industrial and Applied Mathematics, 5(1): 1957, pp. 32-38.
Ono, Yuki et al., "LF-Net: Learning local features from images", 32nd Conference on Neural Information Processing Systems (NIPS 2018), arXiv:1805.09662v2 [cs.CV] Nov. 22, 2018, (13 pages).
Paszke, Adam et al., "Automatic differentiation in Pytorch", 31st Conference on Neural Information Processing Systems (NIPS 2017), Long Beach, CA, USA, (4 pages).
Peyré, Gabriel et al., "Computational Optimal Transport", Foundations and Trends in Machine Learning, 11(5-6):355-607, 2019; arXiv:1803.00567v4 [stat.ML] Mar. 18, 2020, (209 pages).
Qi, Charles R. et al., "Pointnet++: Deep hierarchical feature learning on point sets in a metric space.", 31st Conference on Neural Information Processing Systems (NIPS 2017), Long Beach, CA, USA., (10 pages).

Qi, Charles R et al., "Pointnet: Deep Learning on Point Sets for 3D Classification and Segmentation", CVPR, arXiv:1612.00593v2 [cs.CV] Apr. 10, 201, (19 pages).
Radenović, Filip et al., "Revisiting Oxford and Paris: Large-Scale Image Retrieval Benchmarking", CVPR, arXiv:1803.11285v1 [cs.CV] Mar. 29, 2018, (10 pages).
Raguram, Rahul et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René et al., "Deep fundamental matrix estimation", European Conference on Computer Vision (ECCV), 2018, (17 pages).
Revaud, Jerome et al., "R2D2: Repeatable and Reliable Detector and Descriptor", In NeurIPS, arXiv:1906.06195v2 [cs.CV] Jun. 17, 2019, (12 pages).
Rocco, Ignacio et al., "Neighbourhood Consensus Networks", 32nd Conference on Neural Information Processing Systems (NeurIPS 2018), Montréal, Canada, arXiv:1810.10510v2 [cs.CV] Nov. 29, 2018, (20 pages).
Rublee, Ethan et al., "ORB: An efficient alternative to SIFT or SURF", Proceedings of the IEEE International Conference on Computer Vision. 2564-2571. 2011; 10.1109/ICCV.2011.612654, (9 pages).
Sattler, Torsten et al., "SCRAMSAC: Improving RANSAC's efficiency with a spatial consistency filter", ICCV, 2009: 2090-2097., (8 pages).
Schonberger, Johannes L. et al., "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.
Schonberger, Johannes L. et al., "Structure-from-motion revisited", Proceedings of the IEEE Conference on Computer Vision and Pattern Recognition (CVPR), 2016, pp. 4104-4113, (11 pages).
Sinkhorn, Richard et al., "Concerning nonnegative matrices and doubly stochastic matrices.", Pacific Journal of Mathematics, 1967, pp. 343-348.
Thomee, Bart et al., "YFCC100m: The new data in multimedia research", Communications of the ACM, 59(2):64-73, 2016; arXiv:1503.01817v2 [cs.MM] Apr. 25, 2016, (8 pages).
Torresani, Lorenzo et al., "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne et al., "Wide baseline stereo matching based on local, affinely invariant regions", BMVC, 2000, pp. 1-14.
Ulyanov, Dmitry et al., "Instance normalization: The missing ingredient for fast stylization", arXiv:1607.08022v3 [cs.CV] Nov. 6, 2017, (6 pages).
Vaswani, Ashish et al., "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar et al., "Graph attention networks", ICLR, arXiv:1710.10903v3 [stat.ML] Feb. 4, 2018, (12 pages).
Villani, Cédric , "Optimal transport: old and new", vol. 338. Springer Science & Business Media, Jun. 2008, pp. 1-998.
Wang, Xiaolong et al., "Non-local neural networks", CVPR, arXiv:1711.07971v3 [cs.CV] Apr. 13, 2018, (10 pages).
Wang, Yue et al., "Deep Closest Point: Learning representations for point cloud registration", ICCV, arXiv:1905.03304v1 [cs.CV] May 8, 2019, (10 pages).
Wang, Yue et al., "Dynamic Graph CNN for learning on point clouds", ACM Transactions on Graphics, arXiv:1801.07829v2 [cs.CV] Jun. 11, 2019, (13 pages).
Yi, Kwang M. et al., "Learning to find good correspondences", CVPR, arXiv:1711.05971v2 [cs.CV] May 21, 2018, (13 pages).
Yi, Kwang Moo et al., "Lift: Learned invariant feature transform", ECCV, arXiv:1603.09114v2 [cs.CV] Jul. 29, 2016, (16 pages).
Zaheer, Manzil et al., "Deep Sets", 31st Conference on Neural Information Processing Systems (NIPS 2017), Long Beach, CA, USA; arXiv:1703.06114v3 [cs.LG] Apr. 14, 2018, (29 pages).

(56) References Cited

OTHER PUBLICATIONS

Zhang, Jiahui et al., "Learning two-view correspondences and geometry using order-aware network", ICCV; aarXiv:1908.04964v1 [cs.CV] Aug. 14, 2019, (11 pages).

Zhang, Li et al., "Dual graph convolutional net-work for semantic segmentation", BMVC, 2019; arXiv:1909.06121v3 [cs.CV] Aug. 26, 2020, (18 pages).

International Search Report and Written Opinion dated Feb. 12, 2021, International Application No. PCT/US20/60555, (25 pages).

International Search Report and Written Opinion dated Feb. 2, 2021, International PCT Patent Application No. PCT/US20/60550, (9 pages).

Non Final Office Action dated Jan. 26, 2021, U.S. Appl. No. 16/928,313, (33 pages).

Non Final Office Action dated Mar. 3, 2021, U.S. Appl. No. 16/427,337, (41 pages).

Altwaijry, et al., "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021)] < URL: http://www.bmva.org/bmvc/2016/papers/paper049/index.html >, en lire document, especially Abstract, pp. 1-6 and 9.

Lee, et al., "Self-Attention Graph Pooling", Cornell University Library/Computer Science/ Machine Learning, Apr. 17, 2019 [retrieved on Jan. 8, 2021 from the Internet< URL: https://arxiv.org/abs/1904.08082 >, entire document.

Libovicky, et al., "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021) from < URL: https://doi.org/10.18653/v1/W18-64026 >, entire document, pp. 253-260.

Sarlin, et al., "SuperGlue: Learning Feature Matching with Graph Neural Networks", Cornell University Library/Computer Science/ Computer Vision and Pattern Recognition, Nov. 26, 2019 [retrieved on Jan. 8, 2021 from the Internet< URL: https://arxiv.org/abs/1911.11763 >, entire document.

\* cited by examiner

VIEWING SYSTEM WITH INTERPUPILLARY DISTANCE COMPENSATION BASED ON HEAD MOTION

CROSS-REFERENCE TO RELATED APPLICATIONS

This application claims priority from U.S. Provisional Patent Application No. 62/714,056, filed on Aug. 2, 2018, all of which is incorporated herein by reference in its entirety.

FIELD OF THE INVENTION

This invention is related to connected mobile computing systems, methods, and configurations, and more specifically to mobile computing systems, methods, and configurations featuring at least one wearable component which may be utilized for virtual and/or augmented reality operation.

BACKGROUND

It is desirable that mixed reality, or augmented reality, near-eye displays be lightweight, low-cost, have a small form-factor, have a wide virtual image field of view, and be as transparent as possible. In addition, it is desirable to have configurations that present virtual image information in multiple focal planes (for example, two or more) in order to be practical for a wide variety of use-cases without exceeding an acceptable allowance for vergence-accommodation mismatch.

SUMMARY OF THE INVENTION

The invention provides a viewing system. Including an interpupillary distance (IPD) detector that is positionable to detect an IPD of a user and generate IPD data, a head movement detector device that generates head movement data based on movement of a head of the user, a correlator connected to the IPD detector and the head movement detection device to generate a correlation between the IPD data and the head movement data and a storing system connected to the correlator to store the correlation.

The viewing device may further include an apparatus frame securable to a head of the user, the IPD detector and head movement device being secured to the apparatus frame.

The viewing device may further include that the IPD detector is a camera with a field of capture oriented towards eyes of the user.

The viewing device may further include that the head movement detector includes one or more accelerometers, gyroscopes, inertial measurement units (IMU's) or cameras.

The viewing device may further include that the head movement detector determines a least one rotation and position of the head of the user.

The viewing device may further include a mouth bit interface for the user to bite on to fixedly attach the apparatus frame to the head of the user.

The viewing device may further include that the user can accelerate their head while the IPD data is collected.

The viewing device may further include an IPD compensation factor calculator that calculates an IPD compensation factor based on the correlation.

The viewing device may further include an augmented reality system that generates a visual presentation to a user based at least in part on an IPD of the user and an IPD compensator that adjusts the visual representation based on the IPT compensation factor.

The invention also provides a viewing system, including an augmented reality system that generates a visual presentation to a user based at least in part on an IPD of the user, and an IPD compensator that adjusts the visual presentation based on an IPD compensation factor.

The viewing system may further include a pitch angle detector that detects pitch angle of a head of the user, wherein the IPD compensation factor is dependent on the pitch angle by the pitch angle detector.

The viewing system may further include a viewing calibration system that guides the user through a series of viewing exercises to determine one or more IPD compensation factors.

The viewing system may further include an IPD detector that is positionable to detect an IPD of a user and generate IPD data, a head movement detector device that generates head movement data based on movement of a head of the user, a correlator connected to the IPD detector and the head movement detection device to generate a correlation between the IPD data and the head movement data and a storing system connected to the correlator to store the correlation.

The viewing system may further include an apparatus frame securable to a head of the user, the IPD detector and head movement device being secured to the apparatus frame.

The viewing system may further include that the IPD detector is a camera with a field of capture oriented towards eyes of the user.

The viewing system may further include that the head movement detector includes one or more accelerometers, gyroscopes, inertial measurement units (IMU's) or cameras.

The viewing system may further include that the head movement detector determines a least one rotation and position of the head of the user.

The viewing system may further include a mouth bit interface for the user to bite on to fixedly attach the apparatus frame to the head of the user.

The viewing system may further include that the user can accelerate their head while the IPD data is collected.

BRIEF DESCRIPTION OF THE DRAWINGS

The invention is further described by way of example with reference to the accompanying drawings, wherein.

DETAILED DESCRIPTION

Figure 1:
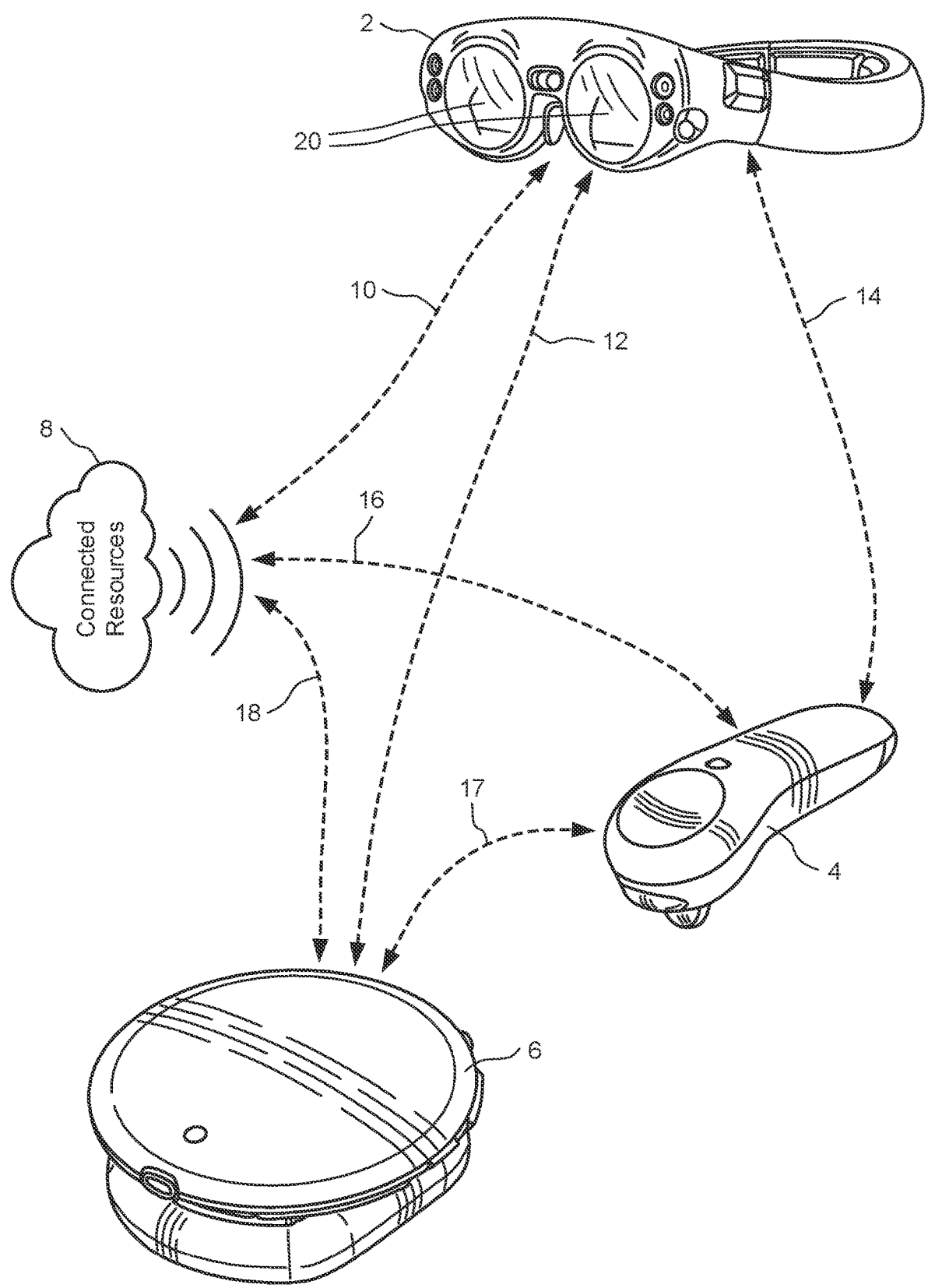
FIG. 1 is a schematic drawing illustrating an augmented reality viewing system.

Referring to FIG. 1, an augmented reality system is illustrated featuring a head-worn viewing component (2), a hand-held controller component (4), and an interconnected auxiliary computing or controller component (6) which may be configured to be worn as a belt pack or the like on the user. Each of these components may be operatively coupled (10, 12, 14, 16, 17, 18) to each other and to other connected resources (8) such as cloud computing or cloud storage resources via wired or wireless communication configurations, such as those specified by IEEE 802.11, Bluetooth®, and other connectivity standards and configurations. As described, for example, in U.S. patent application Ser. Nos. 14/555,585, 14/690,401, 14/331,218, 15/481,255, and 62/518,539, each of which is incorporated by reference herein in its entirety, various aspects of such components are described, such as various embodiments of the two depicted optical elements (20) through which the user may see the world around them along with visual components which may be produced by the associated system components, for an augmented reality experience. In various embodiments, such as the many described in the aforementioned incorporated by reference patent applications, one or more of the components may feature devices or subcomponents, such as accelerometers, gyroscopes, potentiometers, integrated inertial measurement units ("IMU"), and cameras, which may be utilized to determine or estimate the position and/or orientation of an intercoupled user body part (such as the position or orientation of a user's head when coupled to an instrumented head-worn viewing component (2)), as well as assist in determining velocities and/or accelerations thereof, linearly and/or angularly. In various embodiments, such as the many described in the aforementioned incorporated by reference patent applications, it may be valuable for the system to utilize as at least one input the inter-pupillary distance ("IPD") of the individual user in presenting such user with visual information pertaining to the augmented or virtual reality experience. In various embodiments, it may be convenient to simply measure a user's IPD before use of a pertinent system and provide this information to the system as a user input; in other embodiments, it may be that the system is configured to utilize inward-directed (i.e., toward the eyes of the user) devices such as cameras to automatically determine the user's IPD information before and/or during runtime of various applications or presented information. As is discussed in further detail below, while utilizing various embodiments of augmented reality systems and associated testing apparatuses, we have determined that various users may benefit from a compensation or adjustment in the positioning of presented augmented reality information as such users rotate or re-orient their heads in various ways relative to the rest of their bodies and the environments around them. For example, in one embodiment it may be valuable to have a compensation factor that slightly varies the z-axis position (i.e., straight out from the plane of the user's face) of presented augmented reality information with the pitch position of the user's head. This may be related to at least some of these users experiencing an actual or functional change in IPD as they change the pitch of their head, yaw their head to the side, or even roll their head (i.e., such as about a z-axis extending perpendicularly from their nose). In one embodiment, a variation in the IPD information inputted into the pertinent calculations, which may be correlated with head orientation (such as in the form of an equation or lookup table correlating IPD adjustment factor or compensation with head orientation), may be utilized as a compensating variable to generate the presented augmented reality information to the user in such configurations.

Figure 2:
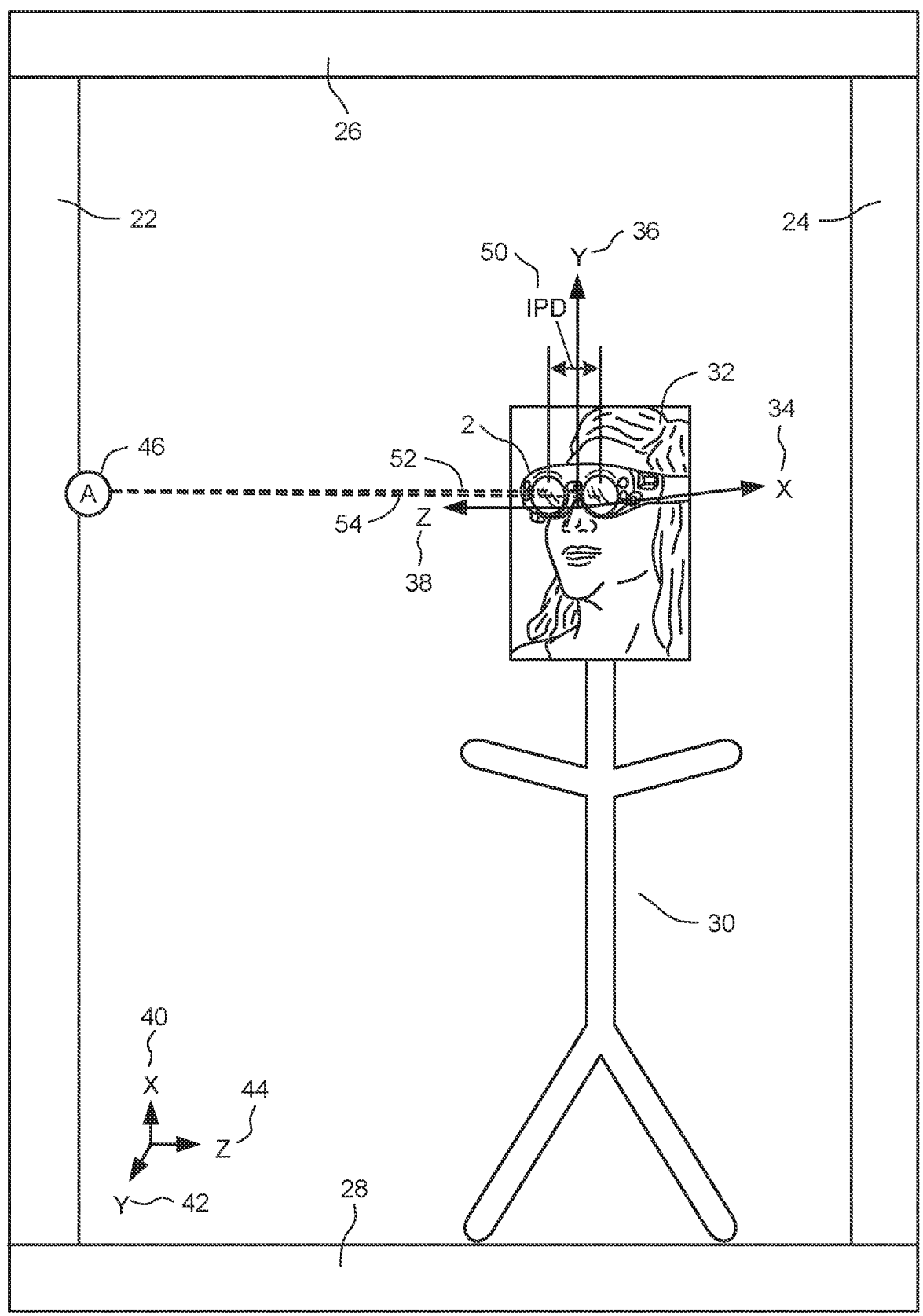
FIG. 2 is a schematic drawing of a user, illustrating various head movements by the user and changes in an interpupillary distance (IPD) of the user.

Referring to FIG. 2, a representation of a user's body (30) with attached head (32) is shown, the user being positioned within a room comprising fixed walls (22, 24), floor (28), and ceiling (26), which together may be associated with a global coordinate system for such room featuring X,Y,Z cartesian coordinates (40, 42, 44, respectively), for example. Another coordinate system may be associated with the head (32) of the user, such that the Z axis (38) is approximately straight out from the face, and the X (34) and Y (36) axes are orthogonal to the Z axis (38) as shown in FIG. 2. The user's head (32) is oriented such that the Z axis (38) is approximately parallel with the Z axis of the room global coordinate system (44), and the gaze vectors (52, 54) from the eyes of the user are focused on a target (46), which may be virtual or actual, at the position of the left wall (22), at a position that causes level eye gaze (52, 54) to be approximately parallel to the Z axis (38) of the user's head, which, as noted above for this example, is approximately level with the floor, or approximately parallel with the Z axis (44) of the room coordinate system. From such a position, the user may pitch their head down toward the floor, or up toward the ceiling. This depicted position may be deemed a zero rotation position, for example, with pitch down toward the floor up to about −90 degrees, and up toward the ceiling by about +90 degrees, capable by the typical person. In the zero rotation position, the IPD (50) may be measured manually and/or automatically using aspects of the augmented reality system wearable component (2).

Figure 3:
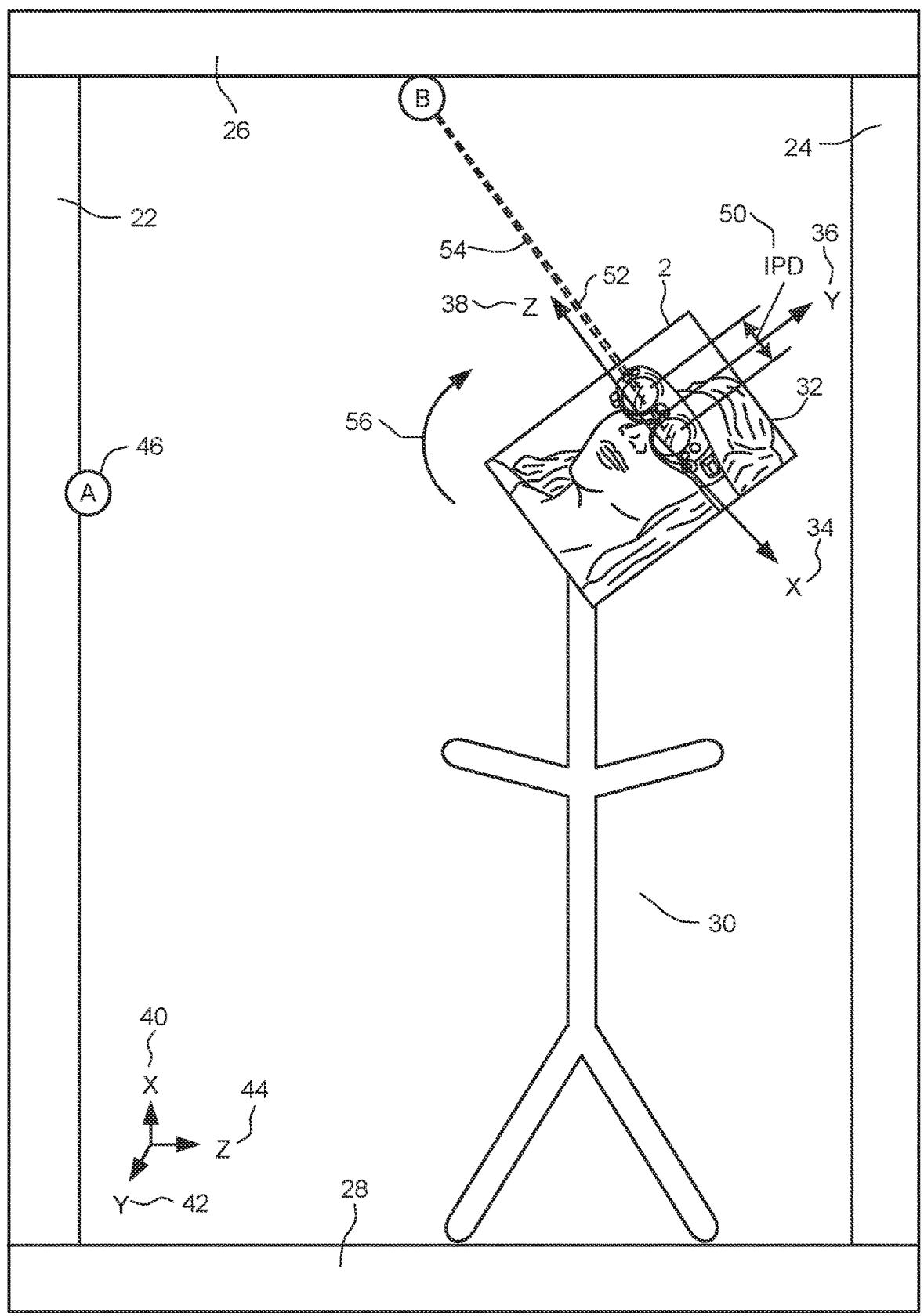
FIG. 3 is a view similar to FIG. 2 with the user tilting their head in an upward direction.

Referring to FIG. 3, the same user (30, 32) is illustrated, with the user's head rotated up (56) to a pitch of about +50 degrees relative to the plane of the floor (28; or the Z axis of the room coordinate system 44), and the gaze of the eyes (52, 54) of the augmented reality system wearable component (2) user are directed toward a second target (48). In such a rotated configuration, the IPD may be measured manually and/or automatically using aspects of the augmented reality system wearable component (2). In laboratory experiments using such a configuration on various subject users, we have found variation in the IPD (50) as the head pitch angle is varied.

Figure 4A:
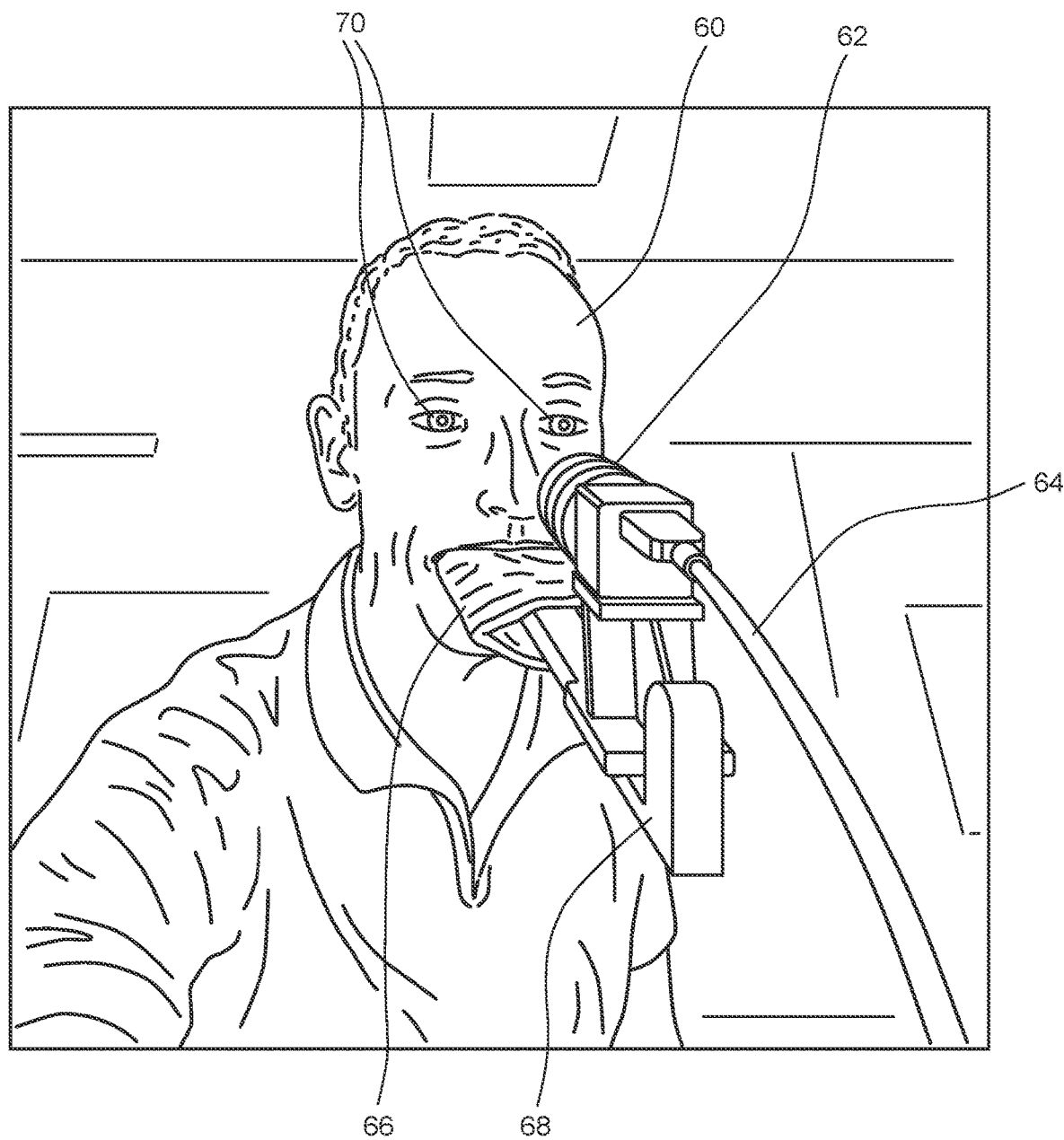
FIGS. 4A and 4B are perspective views illustrating a user with an experimental apparatus that is used to detect IPD compensations based on head motions.
Figure 4B:
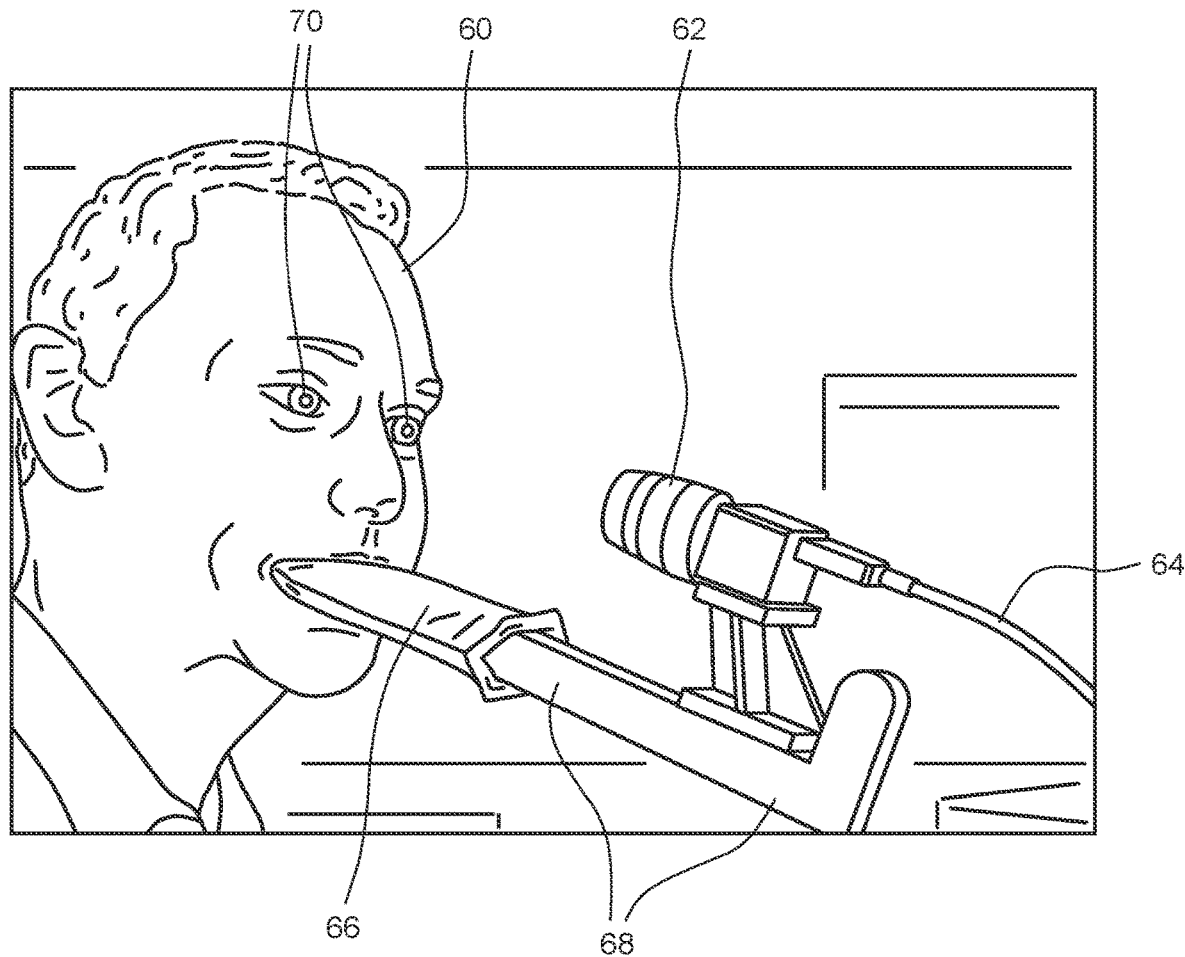
Figure 5:
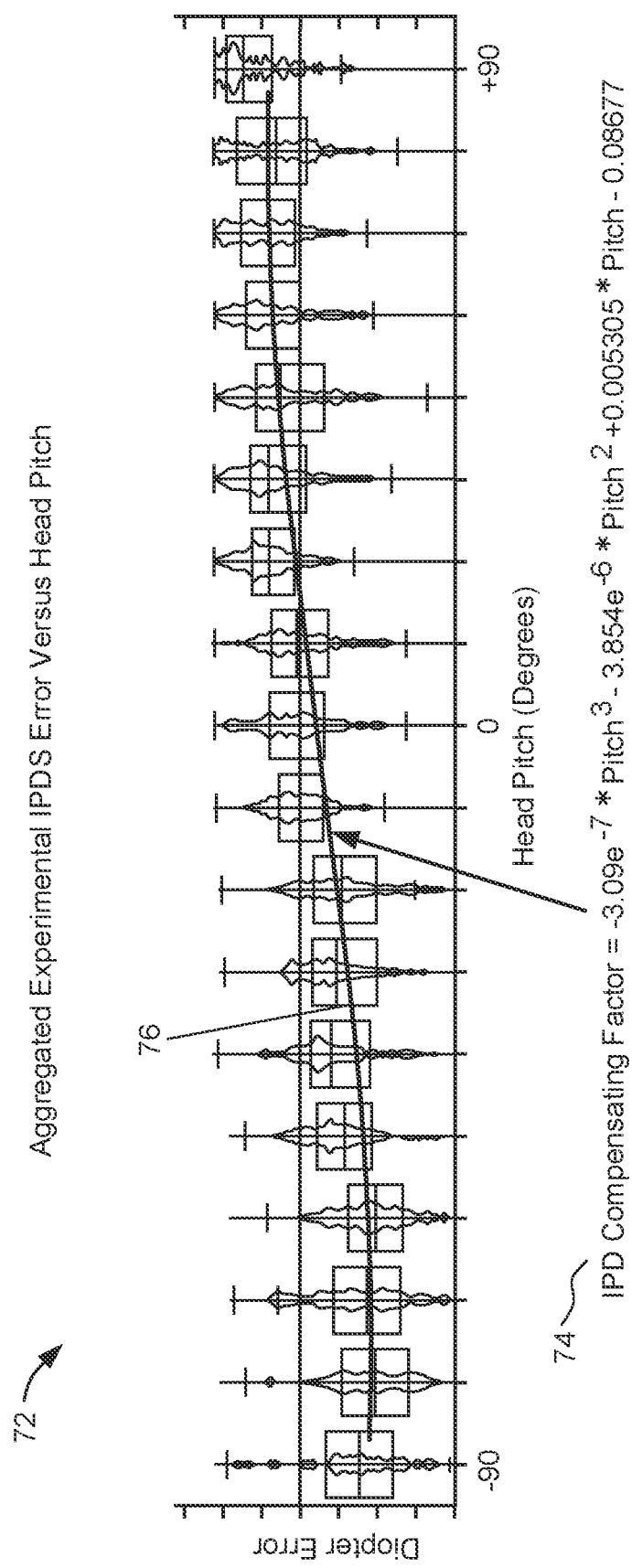
FIG. 5 is a graph illustrating IPD compensating factors relative to head pitch.

Using an experimental apparatus such as that depicted in FIGS. 4A and 4B, we have gathered data from the repositioning of the heads of various users as regards linear and/or rotational position (i.e., relative to the room or surrounding environment), linear and/or rotational velocity (i.e., relative to the room or surrounding environment), and linear and/or rotational acceleration (i.e., relative to the room or surrounding environment). The depicted apparatus comprises a high resolution camera (62) with a field of capture oriented toward the eyes (70) of the user such that the user's IPD may be measured from video information captured by an intercoupled (64) computing system and may also comprise one or more angular or linear motion measurement devices, such as one or more accelerometers, gyroscopes, IMU's, or cameras which may be operatively coupled to the apparatus frame (68) and configured to be utilized to determine rotation/position based upon captured imagery from surroundings (i.e., such as "head pose" determination based upon computer vision techniques). The apparatus frame (68), to which the camera device (62) is fixedly coupled, is removably coupled to the head of the user using a mouth bit interface (66) for the user to bite on such that the user can move and accelerate his head about relatively easily while data is acquired pertaining to his eyes and IPD. Referring to FIG. 5, a chart (72) of sample data from a group of user subjects is illustrated, featuring a plot (76) of diopter error versus head pitch angle; also shown is a polynomial equation mathematically fit through this sample data (74), which may be utilized as an IPD compensating factor (with zero pitch being as shown in FIG. 2; pitch in degrees; −90 being user looking approximately straight down at the floor; +90 being user looking approximately straight up at the ceiling). One can see that in the sample experimental data depicted in FIG. 5, there is a general slight increase in diopter error as the users' heads were pitched from −90, incrementally toward 0, and then up toward +90. The associated IPD compensating factor (74) developed for this sample experimental data, may be utilized as an input to the augmented reality system such that focus is maintained during pitch rotation of the head of a user from this sample, for example.

An apparatus such as that depicted in FIGS. 4A and 4B, or a virtual or augmented reality system with appropriate componentry, such as that illustrated in FIGS. 1 and 2, may be utilized to not only gain information between the relationship of measured IPD and head pitch angle position, but also linear and/or angular velocity in pitch relative to surroundings, and linear and/or angular acceleration in pitch relative to surroundings. Further, such relationships may be determined for other axes, such as an orthogonal yaw axis, or an orthogonal roll axis. We have experimentally seen variations in eye positioning associated with position, velocity, and acceleration changes about each of these axes.

Figure 6A:
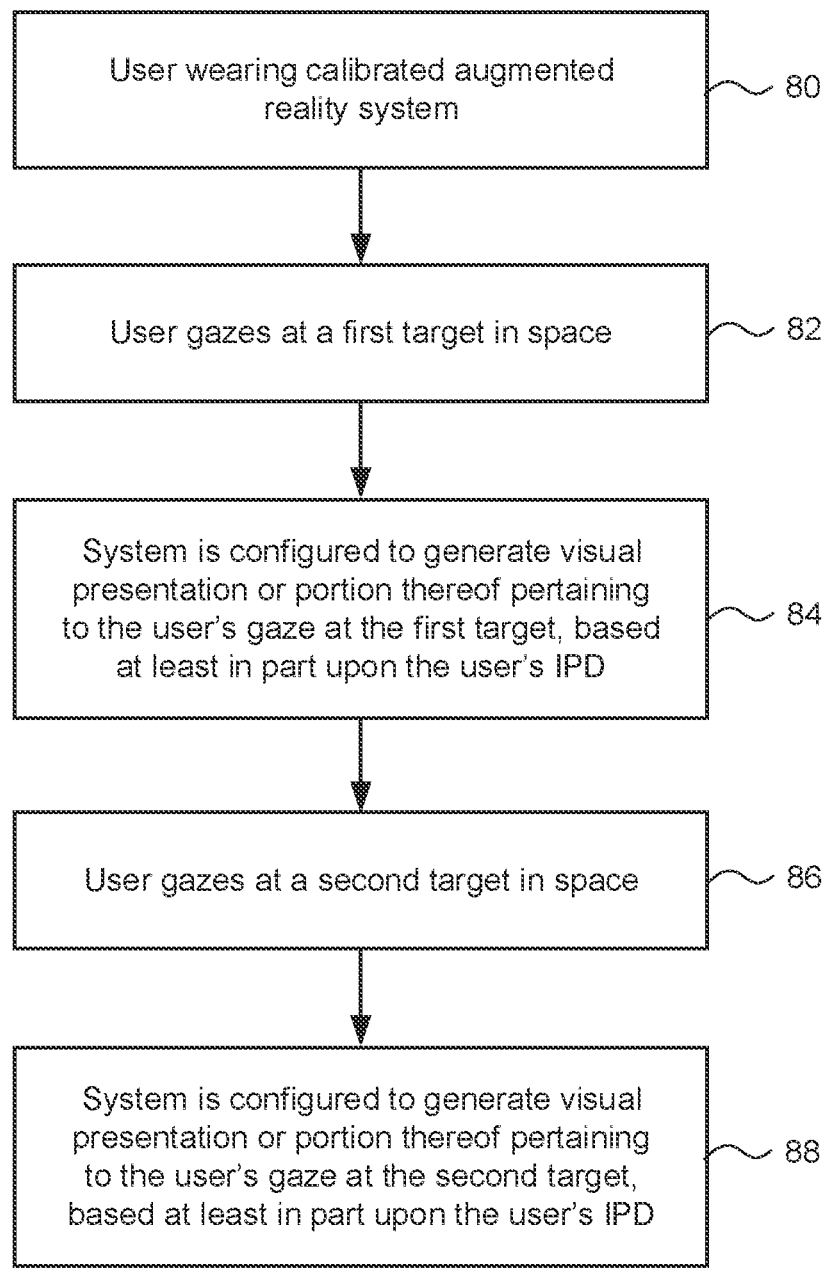
FIG. 6A is a flow chart illustrating IPD head rotation compensation.

Referring to FIG. 6A, a configuration is illustrated without IPD-head-rotation compensation, wherein a user is wearing a calibrated (i.e., with initial input or determination of IPD) augmented reality system (80), for example. As the user gazes at a first target in space (82), the system is configured to generate a visual presentation or portion thereof pertaining to that user's gaze at the first target, based at least in part upon that user's IPD (84). The user may change gaze to a second target (86), and the system may be similarly configured to generate a visual presentation or portion thereof pertaining to that user's gaze at the second target, based at least in part upon, again, that user's IPD (88) (i.e., which has not been compensated for head position or rotation related variables).

Figure 6B:
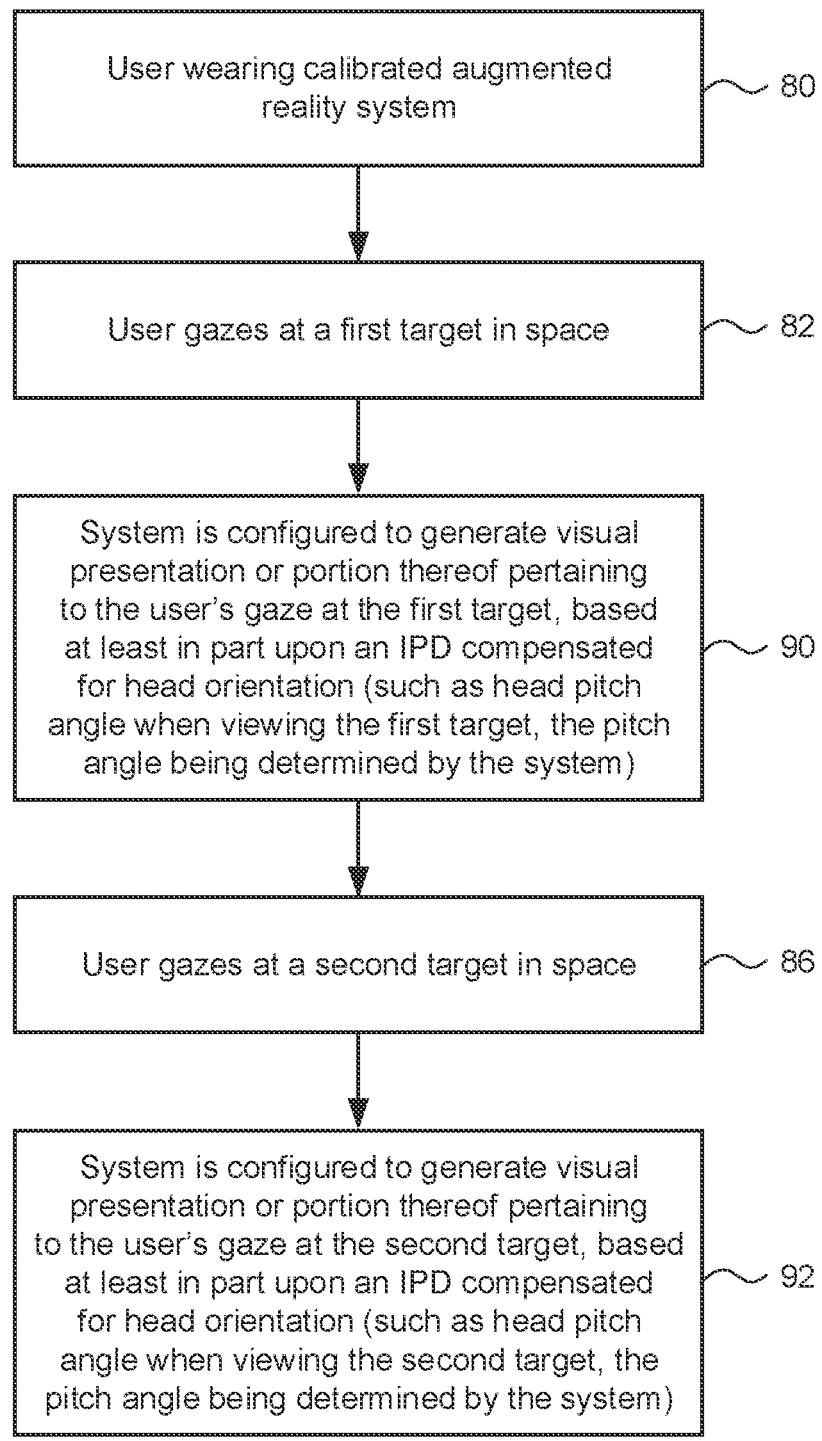
FIG. 6B is a flow chart illustrating IPD head rotation compensation.

Referring to FIG. 6B, a compensated configuration is illustrated, wherein after initial calibration (80) and gaze at a first target (82), the system is configured to generate visual presentation or portion thereof pertaining to the user's gaze at the first target, based at least in part upon an IPD compensated for head orientation (such as head pitch angle when viewing the first target, the pitch angle being determined by the system). Then if the user changes gaze to a second target (86), the system is configured to generate visual presentation or portion thereof pertaining to the user's gaze at the second target, based at least in part upon an IPD compensated for head orientation (such as head pitch angle when viewing the second target, the pitch angle being determined by the system).

Figure 6C:
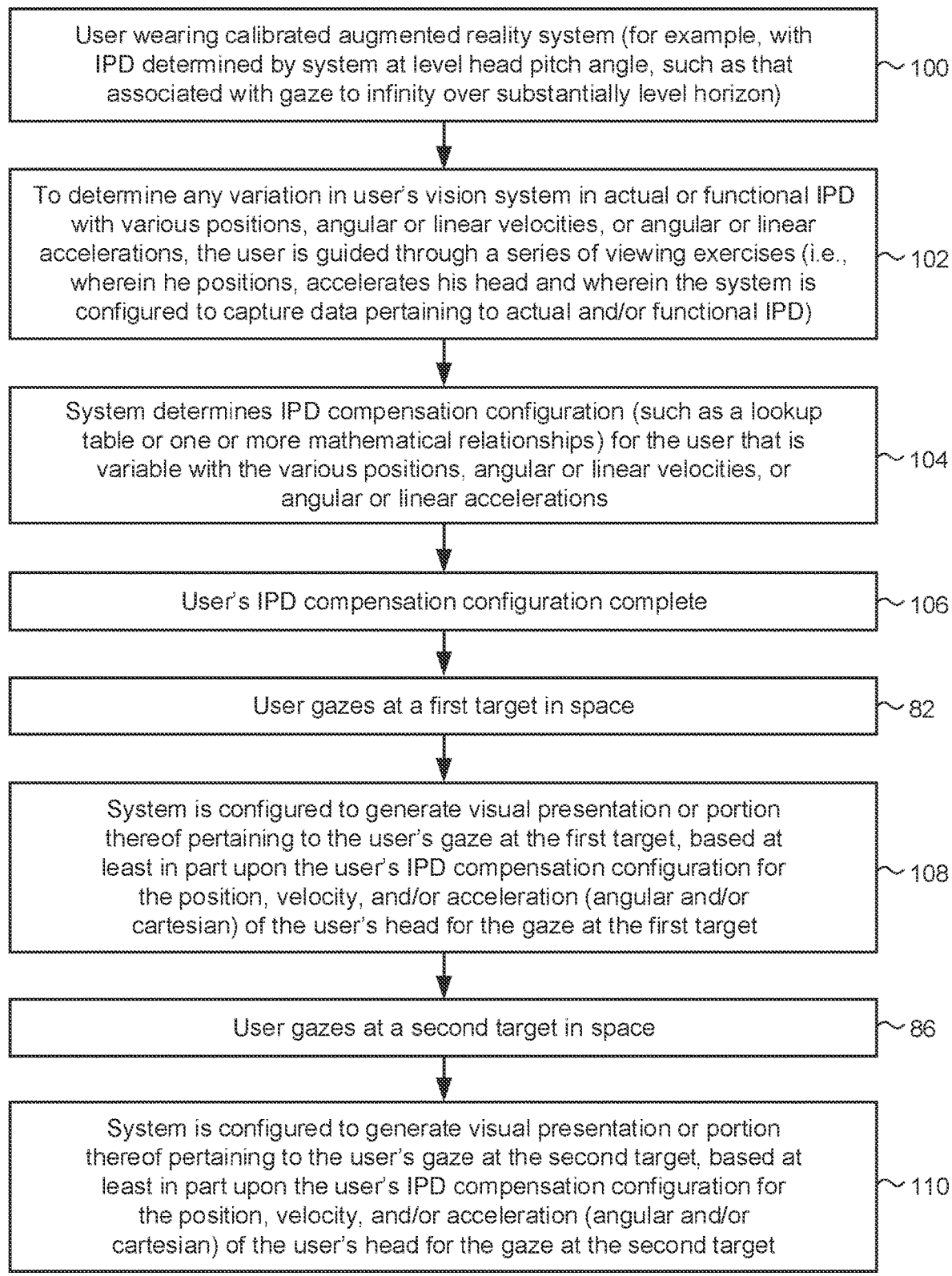
FIG. 6C is a flow chart illustrating IPD head rotation compensation.

Referring to FIG. 6C, the system itself may be utilized to develop one or more compensating relationships for the particular user. As shown in FIG. 6C, a user may be wearing calibrated augmented reality system (for example, with IPD determined by system at level head pitch angle, such as that associated with gaze to infinity over substantially level horizon) (100). To determine any variation in user's vision system in actual or functional IPD with various positions, angular or linear velocities, or angular or linear accelerations, a viewing calibration system may guide the user through a series of viewing exercises (i.e., wherein he positions, accelerates his head and wherein the system is configured to capture data pertaining to actual and/or functional IPD) (102). The system may be configured to determine IPD compensation configuration (such as a lookup table or one or more mathematical relationships) for the user that is variable with the various positions, angular or linear velocities, or angular or linear accelerations (104), completing the user's IPD compensation configuration (106). Then when the user gazes at a first target in space (82), the system may be configured to generate visual presentation or portions thereof pertaining to the user's gaze at the first target, based at least in part upon the user's IPD compensation configuration for the position, velocity, and/or acceleration (angular and/or cartesian) of the user's head for the gaze at the first target (108). Then when the user gazes to a second target (86), the system may be configured to generate visual presentation or portions thereof pertaining to the user's gaze at the second target, based at least in part upon the user's IPD compensation configuration for the position, velocity, and/or acceleration (angular and/or cartesian) of the user's head for the gaze at the second target (110).

Figure 7:
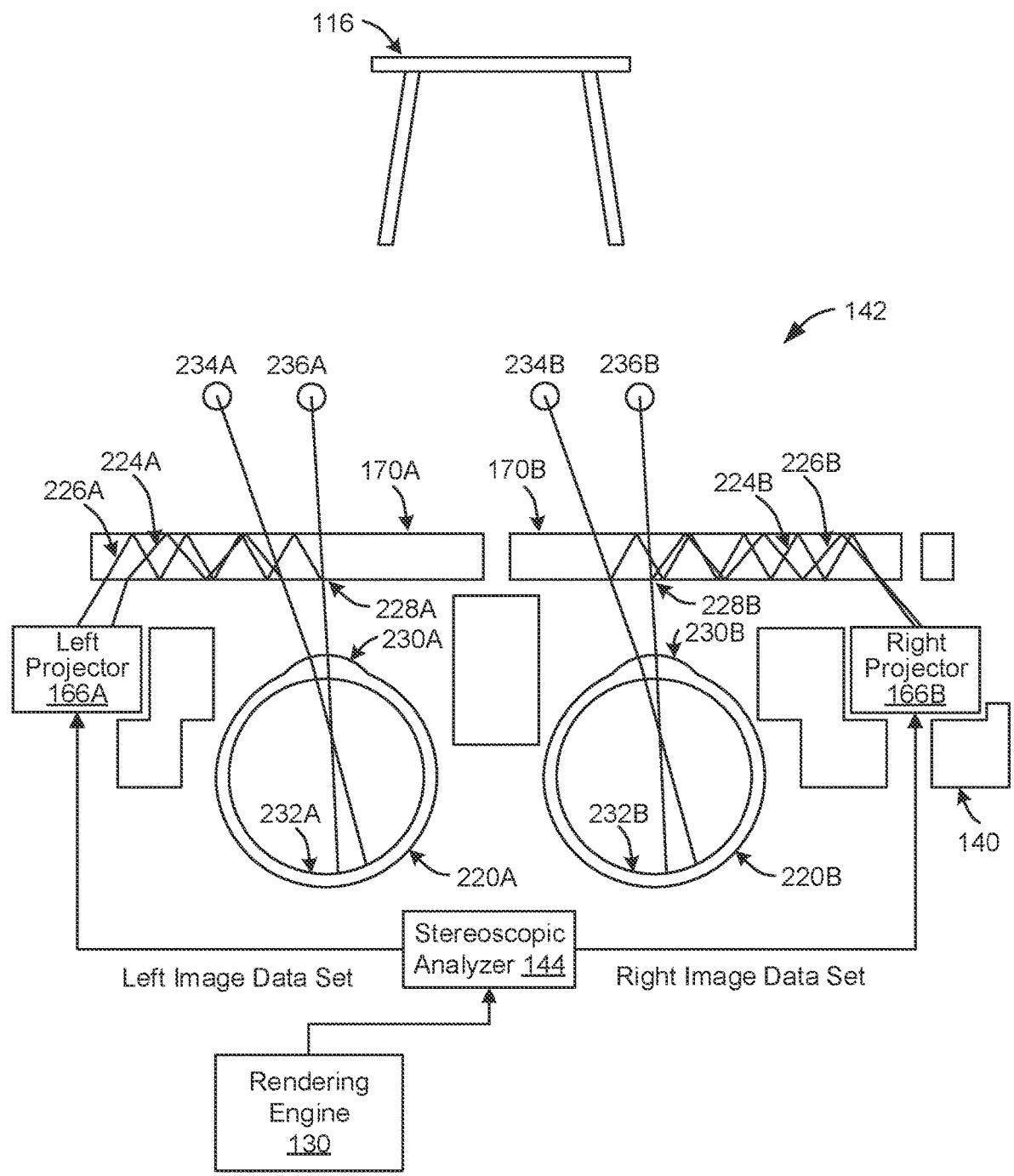
FIG. 7 is a partial top plan view and partial block diagram of an augmented reality system.

FIG. 7 illustrates an augmented reality system 142 of the in more detail. The system 142 includes a stereoscopic analyzer 144 that is connected to the rendering engine 130 and forms part of the vision data and algorithms.

The system 142 further includes left and right projectors 166A and 166B and left and right waveguides 170A and 170B. The left and right projectors 166A and 166B are connected to power supplies. Each projector 166A and 166B has a respective input for image data to be provided to the respective projector 166A or 166B. The respective projector 166A or 166B, when powered, generates light in two-dimensional patterns and emanates the light therefrom. The left and right waveguides 170A and 170B are positioned to receive light from the left and right projectors 166A and 166B, respectively. The left and right waveguides 170A and 170B are transparent waveguides.

In use, a user mounts the head mountable frame 140 to their head. Components of the head mountable frame 140 may, for example, include a strap (not shown) that wraps around the back of the head of the user. The left and right waveguides 170A and 170B are then located in front of left and right eyes 220A and 220B of the user.

The rendering engine 130 enters the image data that it receives into the stereoscopic analyzer 144. The image data is projected onto a plurality of virtual planes. The stereoscopic analyzer 144 analyzes the image data to determine left and right image data sets based on the image data for projection onto each depth plane. The left and right image data sets are data sets that represent two-dimensional images that are projected in three-dimensions to give the user a perception of a depth.

The stereoscopic analyzer 144 enters the left and right image data sets into the left and right projectors 166A and 166B. The left and right projectors 166A and 166B then create left and right light patterns. The components of the system 142 are shown in plan view, although it should be understood that the left and right patterns are two-dimensional patterns when shown in front elevation view. Each light pattern includes a plurality of pixels. For purposes of illustration, light rays 224A and 226A from two of the pixels are shown leaving the left projector 166A and entering the left waveguide 170A. The light rays 224A and 226A reflect from sides of the left waveguide 170A. It is shown that the light rays 224A and 226A propagate through internal reflection from left to right within the left waveguide 170A, although it should be understood that the light rays 224A and 226A also propagate in a direction into the paper using refractory and reflective systems.

The light rays 224A and 226A exit the left light waveguide 170A through a pupil 228A and then enter a left eye 220A through a pupil 230A of the left eye 220A. The light rays 224A and 226A then fall on a retina 232A of the left eye 220A. In this manner, the left light pattern falls on the retina 232A of the left eye 220A. The user is given the perception that the pixels that are formed on the retina 232A are pixels 234A and 236A that the user perceives to be at some distance on a side of the left waveguide 170A opposing the left eye 220A. Depth perception is created by manipulating the focal length of the light.

In a similar manner, the stereoscopic analyzer 144 enters the right image data set into the right projector 166B. The right projector 166B transmits the right light pattern, which is represented by pixels in the form of light rays 224B and 226B. The light rays 224B and 226B reflect within the right waveguide 170B and exit through a pupil 228B. The light rays 224B and 226B then enter through a pupil 230B of the right eye 220B and fall on a retina 232B of a right eye 220B. The pixels of the light rays 224B and 226B are perceived as pixels 134B and 236B behind the right waveguide 170B.

The patterns that are created on the retinas 232A and 232B are individually perceived as left and right images. The left and right images differ slightly from one another due to the functioning of the stereoscopic analyzer 144. The left and right images are perceived in a mind of the user as a three-dimensional rendering.

As mentioned, the left and right waveguides 170A and 170B are transparent. Light from a real-life object such as the table 116 on a side of the left and right waveguides 170A and 170B opposing the eyes 220A and 220B can project through the left and right waveguides 170A and 170B and fall on the retinas 232A and 232B.

Figure 8:
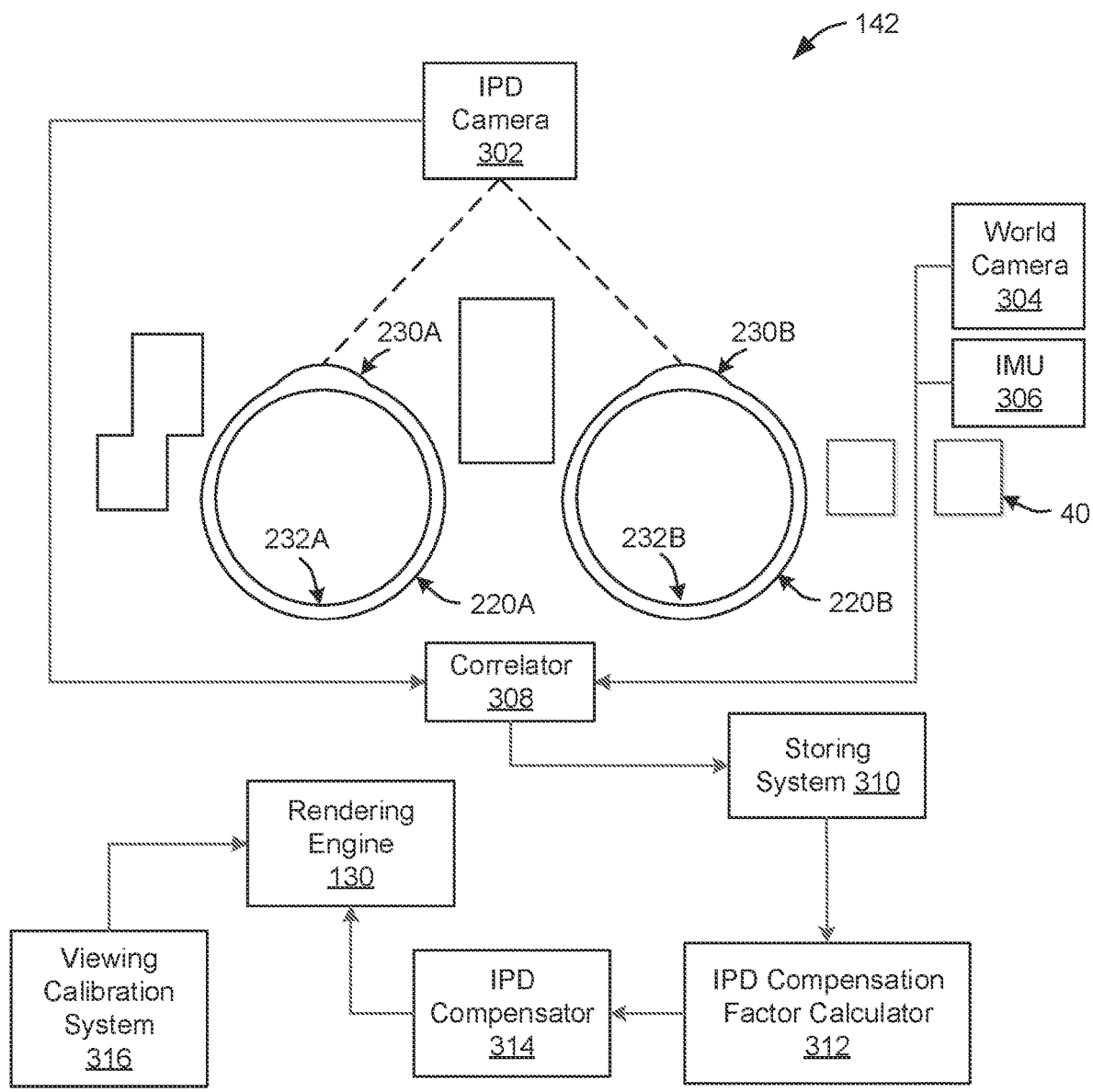
FIG. 8 is a top plan view of the augmented reality system illustrating IPD compensating features thereof.

FIG. 8 shows further details of the device 142 as it relates to IPD compensation as hereinbefore described. The device further includes an IPD camera 302 that serves as an IPD detector, a world camera 304 and an IMU 306 that detect head motion, correlator 308, a storing system 310, an IPD compensation factor calculator 312, an IPD compensator 314 and a viewing calibration system 316. The correlator 308 is connected to the IPD camera 302, the world camera 304 and the IMU 306. The correlator 308 correlates head movement data from the world camera 304 and the IMU 306 with IPD data from the IPD camera 302. The storing system 310 is connected to the correlator 308 and stores the correlation that is generated by the correlator 308. The IPD compensation factor calculator 312 calculates an IPD compensation factor. The IPD compensator 314 is connected to the IPD compensation factor calculator 312 and the rendering engine 130 is connected to the IPD compensator 314. The IPD compensator 314 modifies the visualization created by the rendering engine 130 based on the IPD compensation factor calculator 312.

The viewing calibration system 316 prompts the user through a series of vision tests to generate one or more IPD compensation factors such as the IPD compensation factor calculator 312.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A viewing system comprising:
   an interpupillary distance (IPD) detector that is positionable to detect an IPD of a user and generate IPD data that includes a plurality of IPD values;
   a head movement detector device that is positioned to detect movement of a head of a user and generate head movement data that includes a plurality of head positions based on movement of the head of the user;
   a correlator connected to the IPD detector and the head movement detector device to generate a correlation between the IPD data and the head movement data such that different head positions have different associated respective IPD compensation factors;
   a storing system, being a software component executable by a processor, connected to the correlator to store the correlation;
   an augmented reality system having a light projector that generates a visual presentation to a user based at least in part on an IPD of the user;
   an IPD compensation factor calculator connected to the head movement detector device and operable to calculate a select IPD compensation factor based on the head movement data such that different head positions have different associated respective IPD compensation factors; and
   an IPD compensator that adjusts the visual representation based on the select IPD compensation factor.

2. The viewing device of claim 1, further comprising:
   an apparatus frame securable to a head of the user, the IPD detector and head movement detector device being secured to the apparatus frame.

3. The viewing device of claim 2, wherein the IPD detector is a camera with a field of capture oriented towards eyes of the user.

4. The viewing device of claim 2, wherein the head movement detector device includes one or more accelerometers, gyroscopes, inertial measurement units (IMU's) or cameras.

5. The viewing device of claim 2, wherein the head movement detector device determines a least one of rotation and position of the head of the user.

6. The viewing device of claim 2, further comprising:
   a mouth bit interface for the user to bite on to fixedly attach the apparatus frame to the head of the user.

7. The viewing device of claim 6, wherein the user can accelerate their head while the IPD data is collected.

8. The viewing device of claim 1, further comprising:
   an IPD compensation factor calculator that calculates an IPD compensation factor based on the correlation.

9. A viewing system, comprising:
   an augmented reality system having a light projector that generates a visual presentation to a user based at least in part on an interpupillary distance IPD of the user;
   a head movement detector device that is positioned to detect movement of a head of a user and generate head movement data based on movement of the head of the user;
   an IPD detector that is positionable to detect an IPD of a user and generate IPD data;
   a correlator connected to the IPD detector and the head movement detector device to generate a correlation between the IPD data and the head movement data such that different head positions have different associated respective IPD compensation factors;

a storing system, being a software component executable by a processor, connected to the correlator to store the correlation;

an IPD compensation factor calculator connected to the head movement detector device and operable to calculate a select IPD compensation factor based on the head movement data and the correlation such that different head positions have different associated respective IPD compensation factors; and an IPD compensator that adjusts the visual presentation based on the select IPD compensation factor.

10. The viewing system of claim 9, wherein the head movement detector device includes a pitch angle detector that detects pitch angle of a head of the user, wherein the IPD compensation factor is dependent on the pitch angle by the pitch angle detector.

11. The viewing system of claim 9, further comprising:
a viewing calibration system, including at least a software component executable by a processor, that guides the user through a series of viewing exercises to determine one or more IPD compensation factors.

12. The viewing system of claim 9, further comprising:
an apparatus frame securable to a head of the user, the IPD detector and head movement detector device being secured to the apparatus frame.

13. The viewing system of claim 12, wherein the IPD detector is a camera with a field of capture oriented towards eyes of the user.

14. The viewing system of claim 12, wherein the head movement detector device includes one or more accelerometers, gyroscopes, inertial measurement units (IMU's) or cameras.

15. The viewing system of claim 12, wherein the head movement detector device determines at least one of rotation and position of the head of the user.

16. The viewing system of claim 12, further comprising:
a mouth bit interface for the user to bite on to fixedly attach the apparatus frame to the head of the user.

17. The viewing system of claim 16, wherein the user can accelerate their head while the IPD data is collected.

* * * * *